United States Patent
Matsuda

(10) Patent No.: US 8,422,041 B2
(45) Date of Patent: Apr. 16, 2013

(54) IMAGE PROCESSING APPARATUS, METHOD, AND PROGRAM FOR CONVERTING POSTSCRIPT DATA WITH VARIABLE PRINT DATA INTO A PDF FORMAT CONSIDERING AN ATTRIBUTE OF PLURAL DRAWING OBJECTS

(75) Inventor: Hiroshi Matsuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 287 days.

(21) Appl. No.: 13/056,519

(22) PCT Filed: Oct. 12, 2010

(86) PCT No.: PCT/JP2010/006055
§ 371 (c)(1),
(2), (4) Date: Jan. 28, 2011

(87) PCT Pub. No.: WO2011/048771
PCT Pub. Date: Apr. 28, 2011

(65) Prior Publication Data
US 2011/0255103 A1    Oct. 20, 2011

(30) Foreign Application Priority Data
Oct. 19, 2009  (JP) .................. 2009-240740

(51) Int. Cl.
*G06K 15/02*  (2006.01)
*G06F 17/00*  (2006.01)

(52) U.S. Cl.
USPC ........................ 358/1.13; 715/276

(58) Field of Classification Search ............ 358/1.1, 358/1.9, 1.13, 1.15, 1.18; 715/200, 211, 715/249, 273, 276
See application file for complete search history.

(56) References Cited

U.S. PATENT DOCUMENTS

| | | | |
|---|---|---|---|
| 7,020,837 B1 * | 3/2006 | Kueny ........................ | 715/234 |
| 7,072,052 B1 * | 7/2006 | Tanahashi et al. ........... | 358/1.13 |
| 7,327,478 B2 | 2/2008 | Matsuda | |
| 8,228,540 B2 * | 7/2012 | Himpe ........................ | 358/1.15 |
| 2004/0066527 A1 * | 4/2004 | Kloosterman et al. ....... | 358/1.15 |
| 2005/0125724 A1 | 6/2005 | Peiro et al. | |
| 2008/0165383 A1 | 7/2008 | Myoki | |

OTHER PUBLICATIONS

International Preliminary Report on Patentability and Written Opinion of the International Searching Authority dated Apr. 24, 2012, in counterpart International Application No. PCT/2010/006055.
Makoto Matsuki, "Advancing Standardization of PDF for Printing by ISO Movements of PDF/X-4 and PDF/VT," vol. 92, No. 7, Japan Printer Journal (2009), and English-language translation thereof.
International Search Report and Written Opinion of International Searching Authority for PCT/JP2010/006055, issued Dec. 28, 2010.

* cited by examiner

*Primary Examiner* — Scott A Rogers
(74) *Attorney, Agent, or Firm* — Fitzpatrick, Cella, Harper & Scinto

(57) ABSTRACT

According to an attribute of each of a plurality of drawing objects of data of a PS format included in variable print data, the drawing object of the data of the PS format is converted into partially RIP-completed data of a PDF format or the drawing object of the data of the PS format is converted into RIP-completed image data of the PDF format.

14 Claims, 12 Drawing Sheets

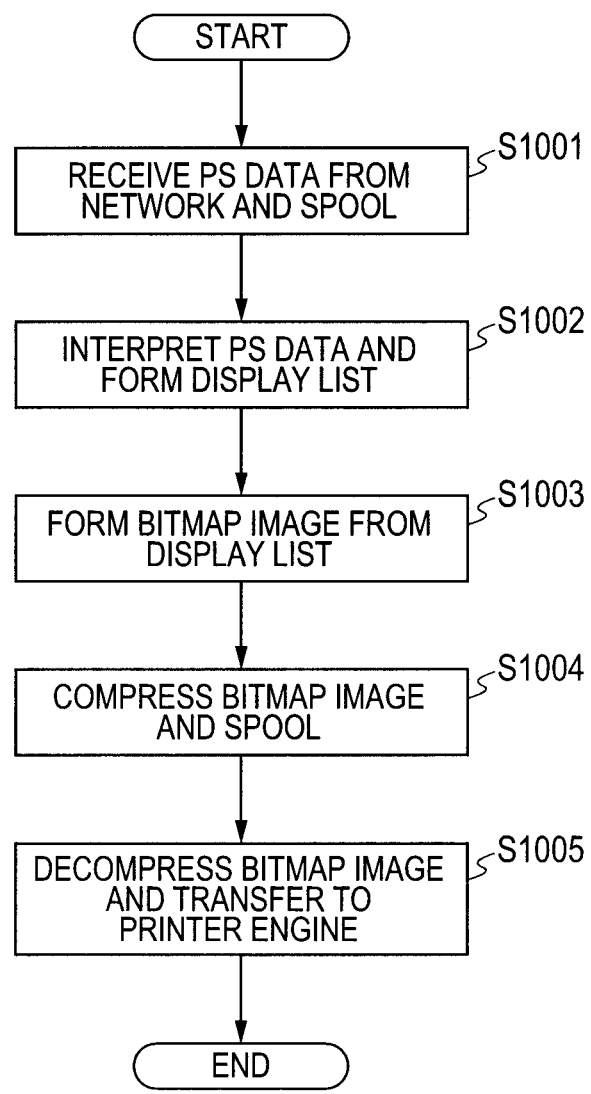

FIG. 6

| | DATA EXPRESSING FORMAT OF PS/PDF | DATA EXPRESSING FORMAT OF DISPLAY LIST |
|---|---|---|
| TEXT | PRINT CHARACTER STRING, FONT NAME (OR EMBEDDED FONT), SIZE, POSITION INFORMATION, ENCODING, COLOR | MASK IMAGE, POSITION INFORMATION, COLOR |
| GRAPHICS (LINE) | STRAIGHT LINE, BEZIER CURVE, COLOR, LINE WIDTH, END SHAPE, POSITION INFORMATION | SET OF LINE SEGMENTS, POSITION INFORMATION, COLOR |
| GRAPHICS (PAINTING) | STRAIGHT LINE, BEZIER CURVE, WINDING RULE, COLOR, POSITION INFORMATION | SET OF LINE SEGMENTS, POSITION INFORMATION, COLOR |
| IMAGE | OUTPUT DEVICE INDEPENDENT SAMPLE DATA (THERE ARE VARIOUS COLOR, PIXEL EXPRESSION, GRADATION, RESOLUTION, AND COMPRESSING FORMAT), POSITION INFORMATION | OUTPUT DEVICE DEPENDENT SAMPLE DATA, POSITION INFORMATION |
| CLIP | STRAIGHT LINE, BEZIER CURVE, POSITION INFORMATION | SET OF LINE SEGMENTS, POSITION INFORMATION |

FIG. 10

| | PDF OF PS COMMAND DESCRIPTION REPLACEMENT | PARTIALLY RIP-COMPLETED PDF | RIP-COMPLETED PDF |
|---|---|---|---|
| TEXT | PRINT CHARACTER STRING, FONT NAME (OR EMBEDDED FONT), SIZE, POSITION INFORMATION, ENCODING, COLOR | MASK IMAGE, POSITION INFORMATION, COLOR | EACH PIXEL IN RASTER IMAGE RENDERED AT OUTPUT RESOLUTION |
| GRAPHICS (LINE) | STRAIGHT LINE, BEZIER CURVE, COLOR, LINE WIDTH, END SHAPE, POSITION INFORMATION | SET OF LINE SEGMENTS, POSITION INFORMATION, COLOR | EACH PIXEL IN RASTER IMAGE RENDERED AT OUTPUT RESOLUTION |
| GRAPHICS (PAINTING) | STRAIGHT LINE, BEZIER CURVE, WINDING RULE, COLOR, POSITION INFORMATION | SET OF LINE SEGMENTS, POSITION INFORMATION, COLOR | EACH PIXEL IN RASTER IMAGE RENDERED AT OUTPUT RESOLUTION |
| IMAGE | OUTPUT DEVICE INDEPENDENT SAMPLE DATA (THERE ARE VARIOUS COLOR, PIXEL EXPRESSION, GRADATION, RESOLUTION, AND COMPRESSING FORMAT), POSITION INFORMATION | OUTPUT DEVICE DEPENDENT SAMPLE DATA, POSITION INFORMATION | EACH PIXEL IN RASTER IMAGE RENDERED AT OUTPUT RESOLUTION |
| CLIP | STRAIGHT LINE, BEZIER CURVE, POSITION INFORMATION | SET OF LINE SEGMENTS, POSITION INFORMATION | NOTHING |

IMAGE PROCESSING APPARATUS, METHOD, AND PROGRAM FOR CONVERTING POSTSCRIPT DATA WITH VARIABLE PRINT DATA INTO A PDF FORMAT CONSIDERING AN ATTRIBUTE OF PLURAL DRAWING OBJECTS

TECHNICAL FIELD

The invention relates to an image processing apparatus, an image processing method, and a program.

BACKGROUND ART

In association with the progress of digital printing, attention has been paid to variable data printing as a form using its feature. A print form in which a part of printed matter is changed as variable data every copy or the like makes the most of characteristics of a digital printer such as an electrophotograph or the like. In the early variable data printing, a variety of VDP (Variable Data Printing) languages have been used in many companies so far. However, nowadays, a PPML (Personalized Print Markup Language) as a standard language is defined and widely used. In the PPML, as elements adapted to draw a page, there are two elements of a reusable object which is repetitively referred to and a local object which is referred to only once. The reusable object is used in the case where a single drawing object is arranged at a plurality of positions in a page, between pages, or between jobs. Ordinarily, a drawing object such as local object, reusable object, or the like uses PostScript (registered trademark; hereinbelow, abbreviated to PS) or a PDF as source drawing data. Those source drawing data is converted into a raster image through an RIP process and, thereafter, arranged on the page. In the case where it is clear that the data is reused like a reusable object of the PPML, an image processing apparatus caches a raster image obtained as a result of execution of an RIP process from the source drawing data. Thus, a very high speed drawing process can be performed. However, in the case where the raster image is color data of high resolution and high gradation, its size is very large. Therefore, a memory of a large capacity is necessary for the image processing apparatus. To solve such a problem, there is also a method whereby intermediate data before the data is converted into the raster image is formed from the source drawing data and cached into the image processing apparatus. Although a time necessary to render the intermediate data remains, a memory capacity necessary to cache can be remarkably reduced and such a method can be regarded as a compromise plan which takes a balance between the memory capacity and performance into consideration.

Further, a standardization of PDF/VT (Variable data and Transactional) has been performed as a VDP language of the next generation. The PDF/VT is a format based on the PDF and it is expected to use the PDF with respect to the specifications of the page drawing. In the PDF/VT, reuse of the drawing object is instructed by using XObject as a drawing component of the PDF. The image processing apparatus can execute the high speed process by caching the reuse-designated XObject by some format. Since the PDF/VT is based on the PDF, an affinity with the PDF workflow or utility existing hitherto is very high. A tool such as existing previewer, preflight check, page layout application, or the like which can process the PDF can be used without a large change. It is an advantage which is not obtained in the VDP language such as a PPML in the related art, and a future spread of such a tool is expected.

If the PDF/VT has been spread as a standard language of the VDP, the occurrence of a demand for conversion from the VDP language in the related art such as a PPML or the like into the PDF/VT is forecasted. By converting into the PDF/VT, the existing VDP data can be used as a resource. It is also because even in the case where the existing VDP language is used, it can be integrated with the workflow based on the PDF. Such a converter for converting from the PPML into the PDF exists (for example, refer to Patent Document 1 (specification of U.S. Patent Application Laid-Open No. 2005-125724)).

In the PPML, a layout description is defined and a print data format such as PS, PDF, or the like is used as a drawing object. Also in the case of converting from the PPML into the PDF/VT, it is necessary to convert the print data for those drawing objects into the PDF. As a processing method of the PS data, two kinds of methods using the existing processing system are considered. One is a method of replacing a description of the PS to a description of the PDF. Drawing models of the PS and the PDF are very analogous and a grain size and an abstract degree of the drawing are maintained almost as they are. The other is a method whereby image data is formed by the RIP which interprets the PS and a PDF comprising the image data is formed.

However, according to the method of replacing the description of the PS to the description of the corresponding PDF, a total converting efficiency of the conversion from the PPML into the PDF/VT and, further, into the raster image is low. Since the format is converted while an information amount of the draw command and the drawing color is simply held, according to the conversion of such a level, the obtained image is not close to the raster image. Therefore, a long time is required for the RIP process of the PDF/VT after the conversion. Even in the case of the VDP language, a possibility of the occurrence of a case where the RIP process is not in time for an engine speed is high. According to the conversion into the image by the RIP, on the other hand, although the total converting efficiency is high, there is such a problem that a data size is very large. If all of the image data is converted into images, since the RIP process becomes unnecessary, there is a surplus processing time of a controller CPU for RIP upon printing. Consequently, it takes a time for conversion from the PPML into the PDF/VT.

Citation List

[Patent Literature]
PTL 1: U.S. Patent Application Laid-Open No. 2005-125724

SUMMARY OF INVENTION

Technical Problem

The invention is made in consideration of the above problems and it is an object to efficiently convert data of a PS format included in variable print data into data of a PDF format with respect to a data size and a processing time.

Solution to Problem

According to the invention, therefore, there is provided an image processing apparatus comprising: partially RIP-completed image data converting means for converting a drawing object of data of a PS format into partially RIP-completed image data of a PDF format; RIP-completed image data converting means for converting the drawing object of the data of the PS format into RIP-completed image data of the PDF format; and selecting means for selecting, according to an attribute of each of a plurality of drawing objects of the data of the PS format included in variable print data, either a mode in which each of the drawing objects of the data of the PS format is converted into the data of the PDF format by the partially RIP-completed image data converting means or a mode in which it is converted into the data of the PDF format by the RIP-completed image data converting means.

BRIEF DESCRIPTION OF DRAWINGS

FIG. 3 is a flowchart illustrating an example of a printing process of PS data.

FIG. 6 is a diagram illustrating a data expressing format in a display list.

FIG. 10 is a diagram for describing differences among a PDF of PS command description replacement, the partially RIP-completed PDF, and the RIP-completed PDF.

DESCRIPTION OF EMBODIMENTS

Embodiments of the invention will be described hereinbelow based on the drawings.

Embodiment 1

Figure 1:
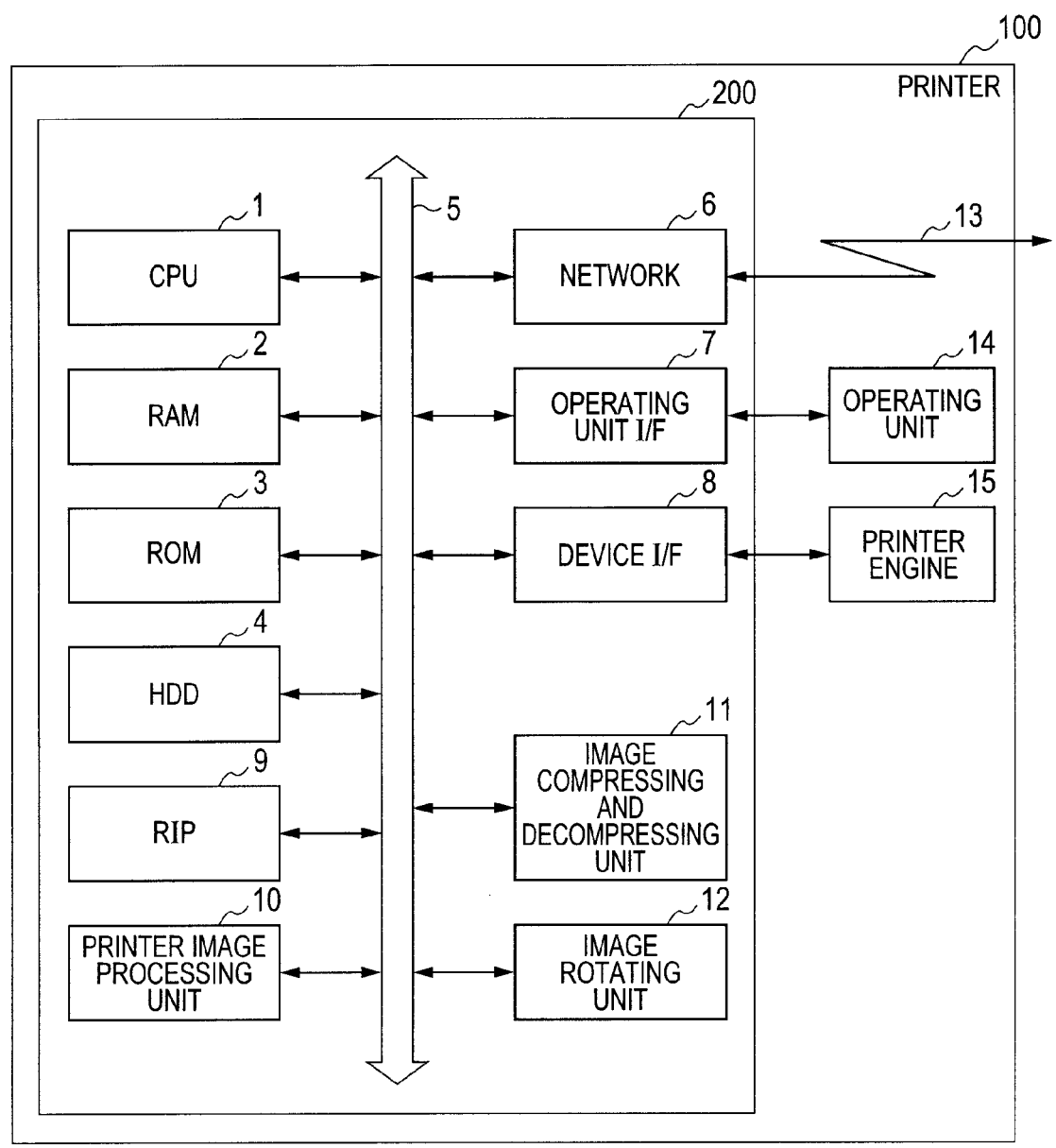
FIG. 1 is a diagram illustrating an example of a hardware construction of an image processing apparatus.

FIG. 1 is a diagram illustrating an example of a hardware construction of an image processing apparatus. Although the embodiment will be described by using a construction of a single image processing apparatus (more specifically speaking, printer 100), a construction in which many processes are separately executed on a host computer which is connected through a network may be used.

In FIG. 1, a controller unit 200 controls input/output of an image signal and device information. A CPU 1 reads out a program stored in a ROM 3 or an HDD 4, stores into a RAM 2, and executes. When the CPU 1 executes the program, a process or the like of each step according to a function construction (module construction) and flowcharts, which will be described hereinafter, is realized. Further, the CPU 1 integratedly controls each device connected to a system bus 5. The RAM 2 functions as a main memory or a work memory of the CPU 1. A boot program which is executed at the time of turn-on of a power source is stored in the ROM 3. An operating system and a control program main body of the present apparatus are stored in the HDD 4. The HDD 4 is also used in order to hold data of a large capacity such as image data, print order, or the like temporarily or for a long time. A network 6 connects the printer 100 to a local area network 13 and plays a role of inputting or outputting the print data or device information to/from devices out of the printer. An operating unit I/F 7 is an interface unit with an operating unit 14 and outputs image data which is displayed onto the operating unit 14 to the operating unit 14. The operating unit I/F 7 plays a role of transferring information which was input from the operating unit 14 by the user of the apparatus to the CPU 1. The operating unit 14 has a liquid crystal panel and a sound source as output devices and has a touch panel and hardware keys as input devices. The controller unit 200 is connected to a printer engine 15 through a device I/F 8. Based on instructions of the CPU 1, the device I/F 8 transmits an image signal, instructs the device operation, and receives the device information. The printer engine 15 is an output apparatus for outputting the image signal from the controller unit 200 onto a medium and may be an apparatus of either an electrophotographic system or an ink jet system. A Raster Image Processor (RIP) 9 is dedicated hardware for developing intermediate print data into a raster image. The RIP 9 processes the intermediate print data formed on the RAM 2 by the CPU 1 at a high speed in parallel with the execution of the CPU 1. A printer image processing unit 10 executes an image correction, a halftone process, or the like to the print output image data. An image rotating unit 12 rotates the image data. An image compressing and decompressing unit 11 executes a compressing/decompressing process of JPEG to multivalue image data and executes a compressing/decompressing process of JBIG, MMR, or MH to binary image data.

Figure 2A:
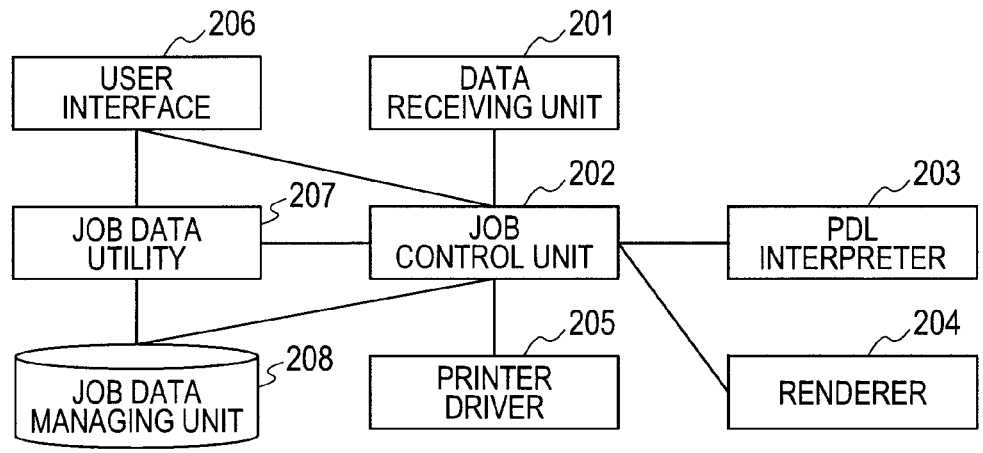
FIG. 2A is a diagram illustrating an example of a software construction of the image processing apparatus.

FIG. 2A is a diagram illustrating an example of a hardware construction or the like of the image processing apparatus.

A data receiving unit 201 receives the print data transmitted from the host. The received data is held in a job data managing unit 208 through a job control unit 202. The job control unit 202 makes whole job control in a range from the data reception to the printing. A PDL interpreter 203 interprets the print data and forms a display list serving as intermediate data. The formed display list is held in the job data managing unit 208 through the job control unit 202. A renderer 204 is a module to form a bitmap image from the display list and many processes are executed by the RIP 9 as dedicated hardware. The formed bitmap image is held in the job data managing unit 208 through the job control unit 202. A printer driver 205 instructs the printing to the printer engine and transmits the bitmap image through the device I/F 8. A user interface 206 is a module to control the operating unit 14 through the operating unit I/F 7. The user interface 206 forms the data which is displayed on a liquid crystal panel of the operating unit 14 and updates the display of the liquid crystal panel according to an input from the touch panel. If the input from the touch panel is some job executing instruction, the user interface 206 transfers the instruction to the job control unit 202. The job data managing unit 208 is a database for holding and managing each of the print data, display list, and bitmap image temporarily or for a long time. A job data utility 207 is a set of utility modules for editing, modifying, or examining various kinds of job data held in the job data managing unit 208.

Figure 2B:
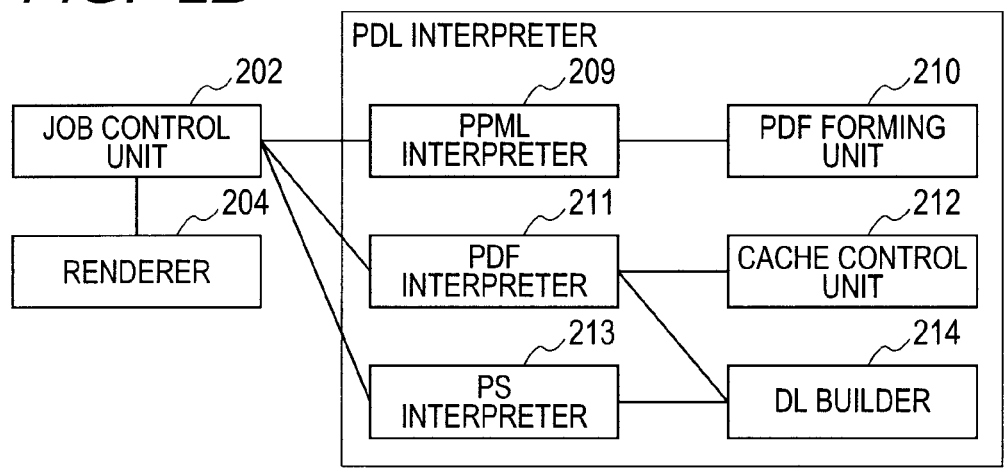
FIG. 2B is a diagram illustrating a construction of a PDL interpreter 203 in more detail.

FIG. 2B is a diagram illustrating a construction of the PDL interpreter 203 in more detail. A PPML interpreter 209 interprets the PPML data. A PDF forming unit 210 receives one of the PDF data, display list, and bitmap image and the layout information from the PPML interpreter and forms a PDF. A PDF interpreter 211 interprets the PDF data. A PS interpreter 213 interprets the PS data. Each of the PDF interpreter 211 and the PS interpreter 213 outputs the display list as intermediate data by a DL builder 214. A cache control unit 212 caches the drawing object by a format of the bitmap image or the display list. When reuse of the drawing object is instructed by the PDF data, the PDF interpreter 211 reuses the drawing object in association with the cache control unit 212. When the PS data or the PDF data is designated as contents of the PPML, the PDF interpreter 211 or the PS interpreter 213 is activated through the job control unit 202. The PS interpreter 213 also has a PDF converting function for outputting the PDF by replacing the draw command in the PS data to the draw command of the corresponding PDF. When the PS interpreter 213 executes the conversion from the PS data into the PDF data, the DL builder 214 does not output the display list.

Figure 2C:
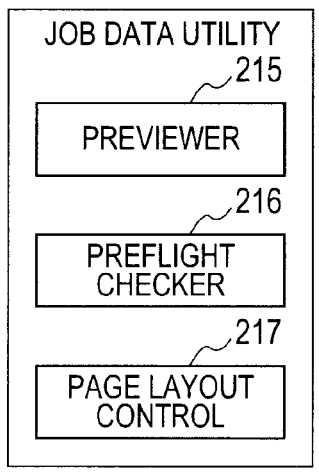
FIG. 2C is a diagram illustrating a construction of a job data utility 207 in more detail.

FIG. 2C is a diagram illustrating a construction of the job data utility 207 in more detail. A previewer 215 is a module for shaping in order to display various kinds of job data by the user interface 206. The previewer 215 executes a resolution conversion into resolution of 72 dpi of the liquid crystal panel and an RGB conversion for an RGB output. When the job data is the display list, the previewer 215 instructs the job control unit 202 to execute the conversion into the bitmap image using the renderer 204. Further, when the job data is the print data, the previewer 215 instructs the job control unit 202 to execute the conversion into the bitmap image using the PDL interpreter 203 and the renderer 204. A preflight checker 216 performs an examination of the job data held as print data as it is, that is, a preflight check. Checks about the embedding of a font into the print data, an input color space, the presence or absence of a very fine line, the presence or absence of an overprint, and the like become main items to be examined. The previewer 215 receives the examining instruction through the user interface 206 and feeds back examination results from the user interface 206. Page layout control 217 executes a booklet page layout or a page intensive layout to the job data. In the image processing apparatus, the preflight check by the preflight checker 216 and the page layout control 217 cannot be executed to the PPML data. Therefore, when the user wants to execute the preflight check and the page layout to the PPML data, it is necessary to temporarily convert the PPML data into the PDF data.

Subsequently, the printing process of the PS data will be described by using a flowchart of FIG. 3.

In S1001, the data receiving unit 201 receives the PS data transmitted from the host computer through the network and notifies the job control unit 202 of the job input. The job control unit 202 spools the received PS data into the job data managing unit 208. Subsequently, in S1002, the job control unit 202 instructs the PS interpreter 213 to interpret the PS data. The PS interpreter 213 interprets the PS data in cooperation with the DL builder 214 and forms a display list as intermediate data. The job control unit 202 temporarily holds the formed display list into the job data managing unit 208. Subsequently, in S1003, the job control unit 202 instructs the renderer 204 to convert the display list into a bitmap. The renderer 204 converts the display list into the bitmap image by using the RIP 9. Subsequently, in S1004, the job control unit 202 compresses the formed bitmap image by the image compressing and decompressing unit 11 and temporarily holds into the job data managing unit 208. The display list after completion of the bitmap conversion is deleted from the job data managing unit 208 by the job control unit 202.

Subsequently, in S1005, the job control unit 202 instructs the printer driver 205 to transmit the bitmap image to the printer engine. The printer driver 205 transmits the bitmap image synchronously with the printer engine 15. The printer driver 205 executes the decompressing process of the bitmap image by the image compressing and decompressing unit 11 before transmitting it. The printer driver 205 deletes the bitmap image whose transmission to the printer engine 15 has been finished from the job data managing unit 208. The processes in S1002 to S1005 may be constructed so as to execute a batch process to data of all pages or to execute a sequential process of every page. In the case of executing the sequential process of every page, the processes in S1002 to S1005 are pipelined and the processes are executed in parallel.

Figure 4:
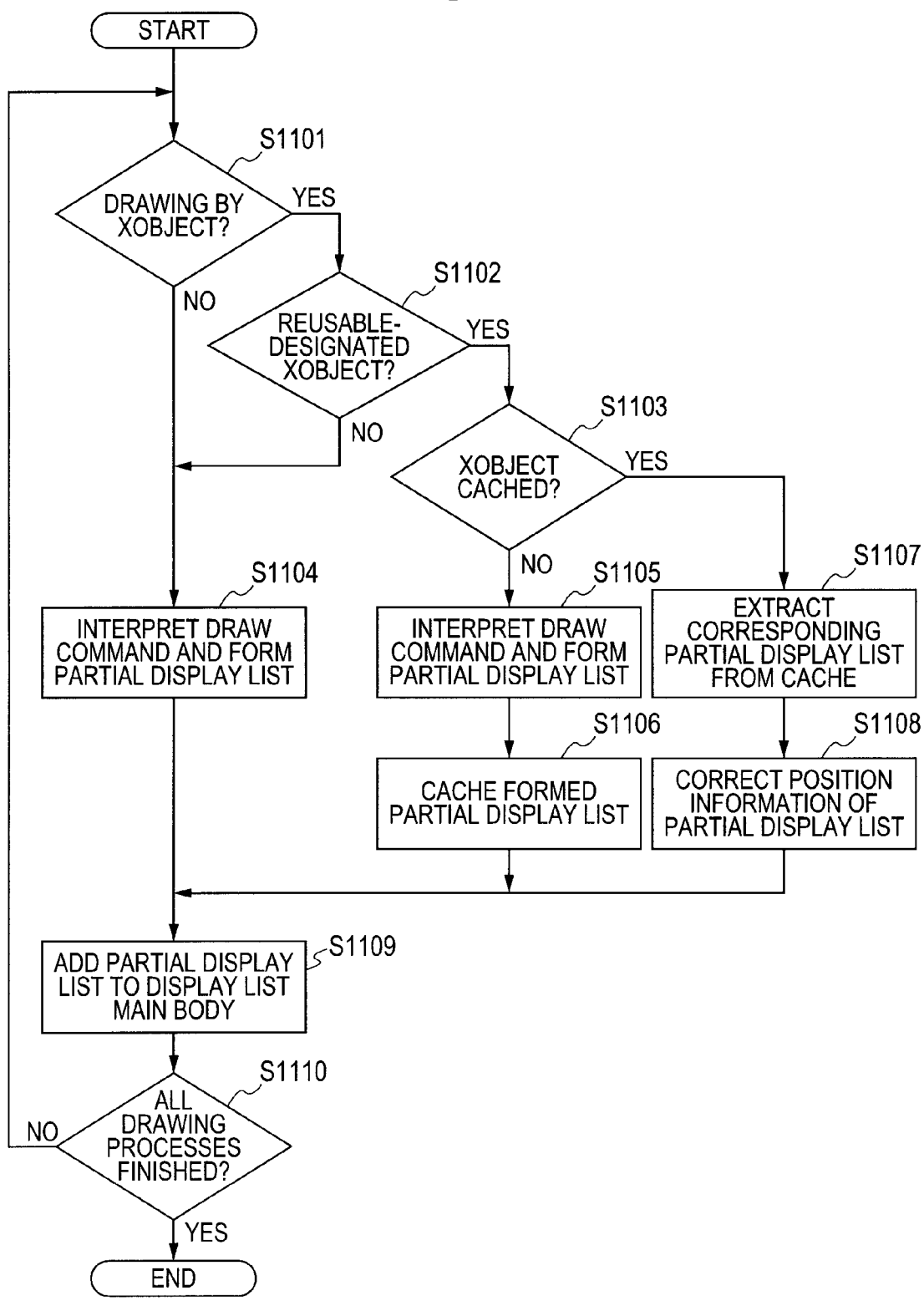
FIG. 4 is a flowchart illustrating an example of a printing process of PDF data.

Subsequently, the printing process of the PDF data will be described by using FIG. 4. A flowchart for the printing process of the PDF data is substantially the same as the printing flowchart of the PS except for S1002 in FIG. 3. Therefore, only the process for interpreting the PDF data and forming a display list will be described in detail.

In S1101, the PDF interpreter 211 discriminates whether or not the drawing which will be performed next is the drawing by XObject of the PDF. If YES, S1102 follows and the PDF interpreter 211 discriminates whether or not above XObject is an object which has been reusable-designated. If NO in S1101 or if NO in S1102, S1104 follows and the PDF interpreter 211 interprets the draw command and forms a partial display list. If the data is not the PDF which intends to perform the VDP, the above process is always executed. If YES in S1102, S1103 follows and the PDF interpreter 211 discriminates whether or not above XObject has been cached. If NO, S1105 follows and the PDF interpreter 211 interprets the draw command and forms a partial display list. The processing routine advances to S1106 and the cache control unit 212 caches the formed partial display list. If YES in S1103, S1107 follows and the cache control unit 212 extracts the corresponding partial display list from the cache. The processing routine advances to S1108 and the PDF interpreter 211 corrects position information on the partial display list. At a point of time when the partial display list has been cached, it is unknown at which position of the page the partial display list is arranged. Therefore, the position information is corrected at timing when the partial display list is actually extracted from the cache and used. Now, if the partial display list has been cached, since there is no need to form the partial display list again, the PDF interpreting process is executed at a high speed. Even if the process passed through any processing path, the processing routine advances to S1109 and the PDF interpreter 211 adds the formed partial display list to the display list main body. The processing routine advances to S1110 and the PDF interpreter 211 discriminates whether or not all of the drawing processes have been finished. If NO, the processing routine is returned to S1101 and similar processes are repeated until all of the drawing processes are finished.

Subsequently, the converting process from the PPML into the PDF/VT will be described by using FIG. 5. The printing of the PPML data in the image processing apparatus is substantially the same as the PDF printing described by using FIGS. 3 and 4 except that the converting process from the PPML into the PDF is added. The converting process from the PPML into the PDF is added before the PDF interpreting process described by using FIG. 4.

In S1201, the PPML interpreter 209 interprets the PPML data, refers to the drawing object, and extracts the layout information in the page. In the PPML, the drawing object is referred to as a file separately from the PPML main body and stored in the job in PS, PDF, JPEG or TIFF format. Subsequently, the processing routine advances to S1202 and the PPML interpreter 209 discriminates whether or not the extracted drawing object is the PDF. If YES, S1203 follows and the PDF forming unit 210 converts the designated page of the PDF into single XObject. When the drawing object which is referred to from the PPML is the PDF, the single drawing object is included in the designated page of the PDF. If NO in S1202, S1204 follows and the PPML interpreter 209 further discriminates whether or not the extracted drawing contents are the EPS. The EPS is used to express the drawing object which does not have a concept of the page in one format of PostScript. That is, in the process of S1204, the PPML interpreter 209 discriminates whether or not the drawing contents are the drawing object of the data of the PS format.

If YES in S1204, S1205 follows and the PS interpreter 213 executes the converting process from the EPS into XObject of the PDF. That is, in S1205, the PS interpreter 213 converts the drawing object of the data of the PS format into XObject of the PDF format. The converting process from the EPS into XObject of the PDF will be described in detail hereinafter.

If NO in S1204, S1206 follows and the PDF forming unit 210 executes the converting process from the image data of JPEG or TIFF into XObject of the PDF. When the converting process into XObject of the drawing object is finished, the processing routine advances to S1207. In S1207, the PDF forming unit 210 discriminates whether or not the drawing object which is being processed at present is the object which was reusable-designated by the PPML. If YES, S1208 follows and the PDF forming unit 210 adds hint information to formed XObject. Whether or not XObject is reusable is decided by the hint information. If NO in S1207, S1208 is skipped and the PDF forming unit 210 advances to a process of S1209. In S1209, the PPML interpreter 209 discriminates whether or not the processes of all drawing objects in the page have been finished. If NO, the processing routine is returned to S1202 and a similar process is continuously executed to the next drawing object. If YES in S1209, S1210 follows and the PDF forming unit 210 integrates XObject based on the layout information and forms page contents. S1211 follows and the PPML interpreter 209 discriminates whether or not the processes of all pages in the job have been finished. If NO, the processing routine is returned to S1202 and a similar process is continuously executed to the drawing object of the next page. If YES in S1211, S1212 follows and the PDF forming unit 210 integrates all pages and forms single PDF data.

Figure 5:
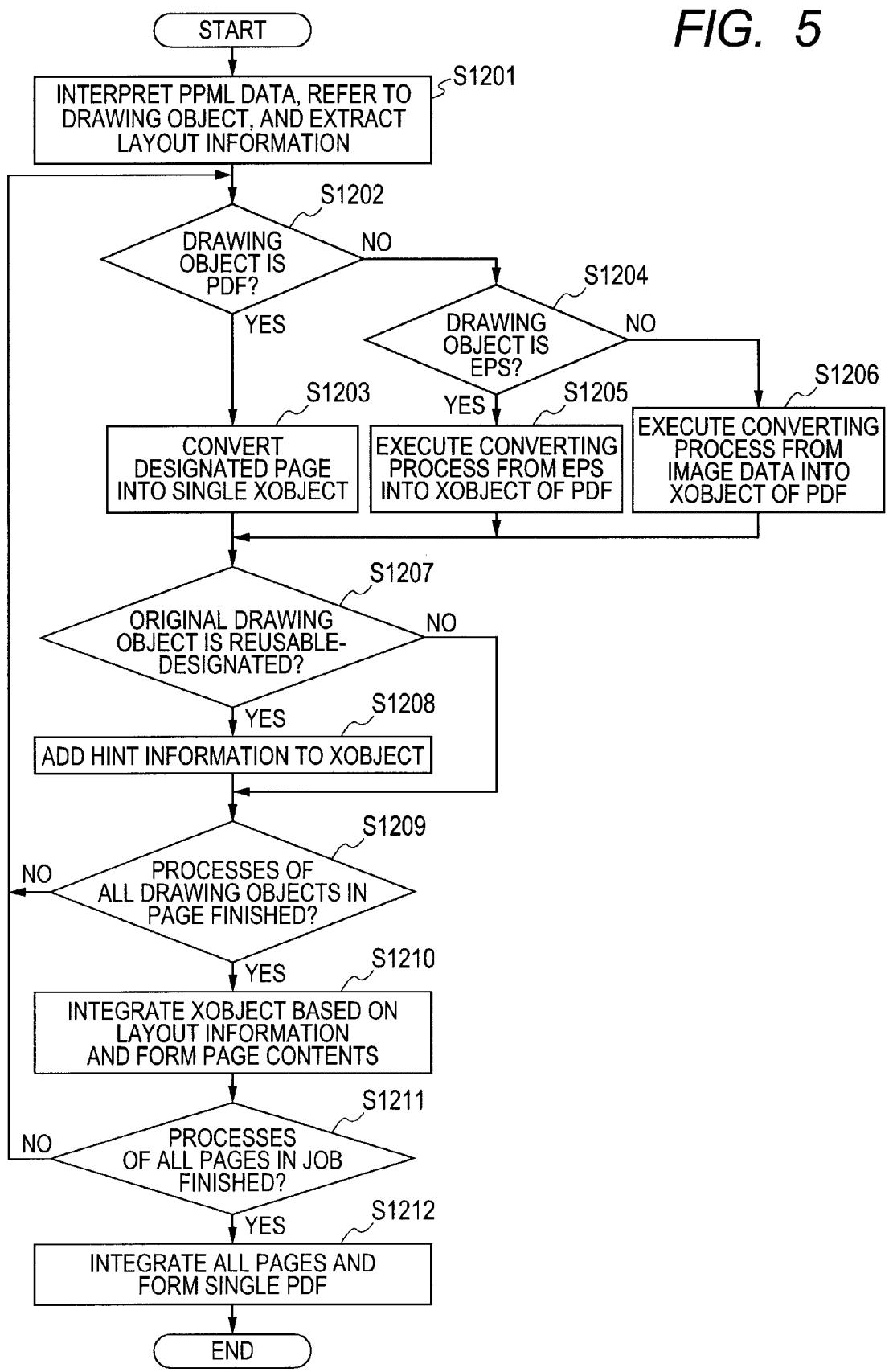
FIG. 5 is a flowchart illustrating an example of a process for converting PPML data into a PDF.

The image processing apparatus has the following three methods as a method of executing the conversion from the EPS into XObject of the PDF described in S1205 in FIG. 5. The first is a method of replacing a command description of the EPS to a description of the corresponding PDF. The second is a method of forming image data by the RIP which interprets the EPS and forming a PDF comprising the image data. The third is a method of forming a partially RIP-completed PDF from the display list formed by the PS interpreter which interprets the EPS.

A data expressing format of the display list serving as a source of the partially RIP-completed PDF will be described by using FIG. 6 in comparison with a data expressing format of the PS/PDF. In the case of a text, in the PS/PDF, the data is expressed by a print character string, a font name, a size, position information, an encoding, and a color. In the case of a built-in font, although only the font name is designated, font data itself can be also embedded into the PS/PDF data. On the other hand, in the display list, the data is expressed by a mask image, position information, and a color. The mask image is image data of a gradation of 1 bit showing a shape of each character and expresses pixels which are painted and pixels which leave a background. In the case of graphics (line), in the PS/PDF, the data is expressed by a straight line (start point, end point), a Bezier curve (start point, control point, end point), a color, a line width, an end shape, and position information. On the other hand, in the display list, the data is expressed by a set of line segments showing an external shape in the case where the line is considered as a closed area, position information, and a color. That is, the data expressed by the line width and the end shape in the PS/PDF is expressed by the external shape of the line and the curve is divided into a plurality of line segments. In the case of graphics (painting), in the PS/PDF, the data is expressed by a straight line (start point, end point), a Bezier curve (start point, control point, end point), a winding rule, a color, and position information. On the other hand, in the display list, the data is expressed by a set of line segments showing an external shape in the case where the painted area is considered as a closed area, position information, and a color. That is, in the case of graphics, although the original image is a line and a painting, a similar expression is used as a display list. Subsequently, in the case of an image, in the PS/PDF, the data is expressed by output device independent sample data in which a color, a pixel expression, gradation, resolution, and a compressing format are various and position information. On the other hand, in the display list, the data is expressed by sample data in which a color, a pixel expression, gradation, resolution, and a compressing format depend on the output device and position information. Subsequently, in the case of a clip, in the PS/PDF, the data is expressed by a straight line (start point, endpoint), a Bezier curve (start point, control point, end point), and position information. On the other hand, in the display list, the data is expressed by a set of line segments and position information. With respect to the color and the position information, although they are common elements in the PS/PDF and the display list, their details differ. Although the color in the PS/PDF is expressed on various kinds of color spaces such as CMYK, CIE, RGB, and Gray, the color in the display list is expressed by a single color space which depends on the printer engine. The number of gradations which can be expressed is also determined in dependence on the printer engine. Although the position information in the PS/PDF can be expressed by an arbitrary coordinate interval including a user space, the position information in the display list is expressed by a device coordinate interval which depends on device pixels.

Figure 7:
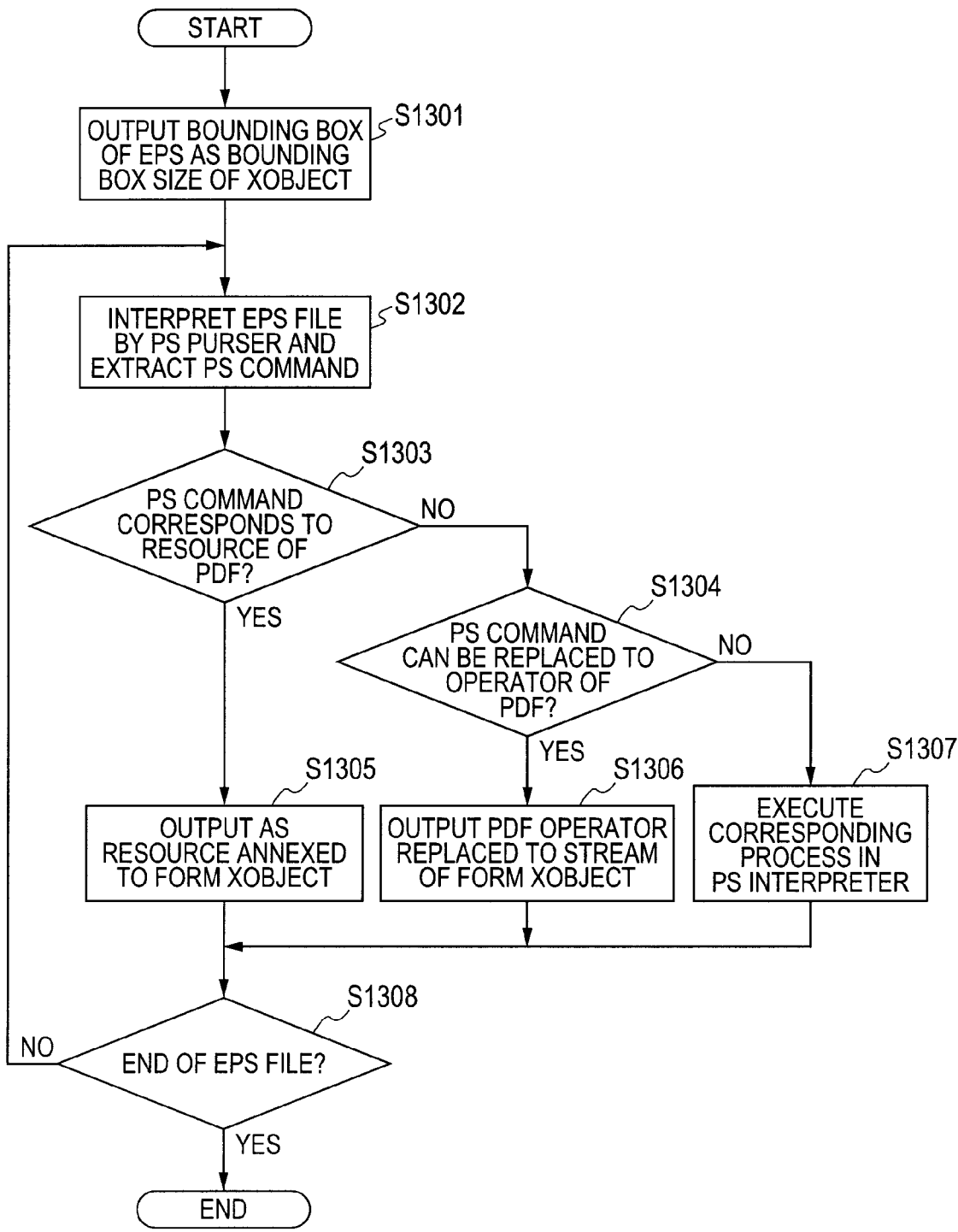
FIG. 7 is a flowchart illustrating an example of a process for converting a command description of an EPS into a description of the PDF.

The method of replacing the command description of the EPS to the corresponding description of the PDF as one of the converting methods from the EPS into XObject of the PDF will be described by using FIG. 7.

In S1301, the PS interpreter 213 outputs a bounding box of the EPS as a bounding box of XObject. In the method of replacing to the corresponding command description, Form XObject among a plurality of kinds of existing XObject is used. Subsequently, S1302 follows and the PS interpreter 213 interprets the EPS file by a PS purser and extracts the PS command. In S1303, the PS interpreter 213 discriminates whether or not the PS command corresponds to Resource of the PDF. Image data, font data, and color space designation correspond to Resource. If YES, S1305 follows and the PS interpreter 213 outputs it as Resource annexed to Form XObject. If NO in S1303, S1304 follows and the PS interpreter 213 discriminates whether or not the PS command can be replaced to an operator of the PDF. If YES, S1306 follows and the PS interpreter 213 outputs the PDF operator replaced to a stream of Form XObject. If NO in S1304, S1307 follows and the PS interpreter 213 executes a process corresponding to the PS command. In this case, the PS command is merely consumed in the PS interpreter and is not output to Form XObject. Finally, the processing routine advances to S1308 and the PS interpreter 213 detects about an end of the EPS file. If NO, the processing routine is returned to S1302 and the PS interpreter 213 repeats similar processes. If YES, the conversion into PDF XObject is finished. Either a mode in which the PS interpreter 213 forms the PDF in which the command description has been replaced or a mode in which it forms the display list can be switched by an instruction from the outside.

A method of forming a partially RIP-completed PDF from the display list formed by the PS interpreter which interprets the EPS as one of the converting methods from the EPS into XObject of the PDF will be described by using FIG. 8.

In S1401, the PS interpreter 213 outputs a bounding box of the EPS as a bounding box of XObject. In the method of forming the partially RIP-completed PDF, Form XObject among a plurality of kinds of XObject is used. Subsequently, in S1402, the PS interpreter 213 interprets the EPS file by the PS purser and extracts the PS command. Subsequently, in S1403, the PS interpreter 213 discriminates whether or not the PS command instructs the drawing. If YES, S1404 follows and the PS interpreter 213 converts the draw command based on the PS command into the expressing format of the display list illustrated in FIG. 6. Subsequently, S1405 follows, the PDF forming unit 210 converts the expressing format of the display list into the PDF operator. S1406 follows and the PDF forming unit 210 outputs the PDF operator converted into the stream of Form XObject. If NO in S1403, S1407 follows and the PS interpreter 213 executes the process corresponding to the PS command. In this case, the PS command is merely consumed in the PS interpreter and is not output to Form XObject. Finally, S1308 follows and the PS interpreter 213 detects about the end of the PS file. If NO, the processing routine is returned to S1402 and the PS interpreter 213 repeats similar processes. If YES, the conversion into PDF XObject is finished.

Figure 9:
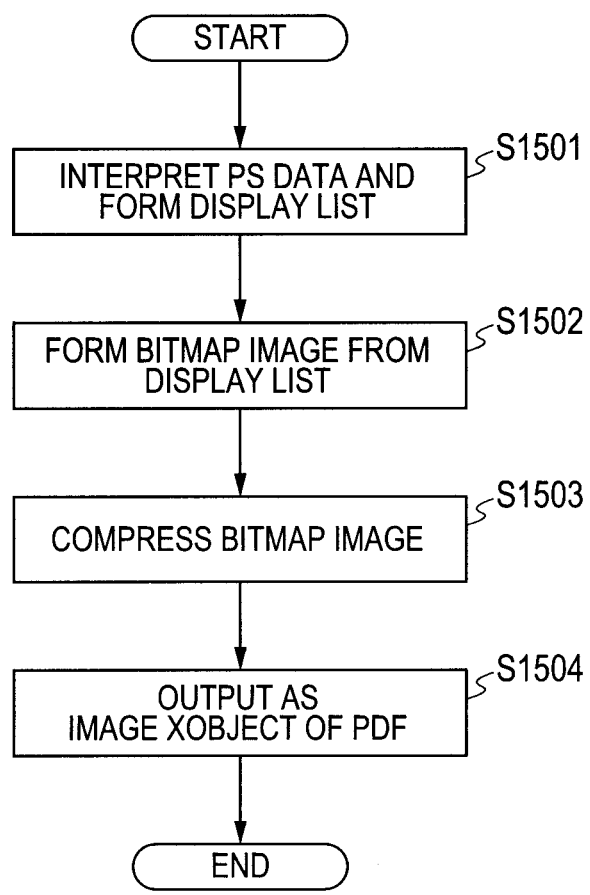
FIG. 9 is a flowchart illustrating an example of a process for interpreting the EPS and forming a PDF comprising RIP-completed image data.

A method of forming image data by the RIP which interprets the EPS and forming the PDF as one of the converting methods from the EPS into XObject of the PDF will be described by using FIG. 9.

In S1501, the PS interpreter 213 interprets the PS data in cooperation with the DL builder 214 and forms a display list as intermediate data. The job control unit 202 temporarily holds the formed display list into the job data managing unit 208. Subsequently, in S1502, the job control unit 202 instructs the renderer 204 to convert the display list into a bitmap. The renderer 204 converts the display list into the bitmap image by using the RIP 9. Subsequently, in S1503, the job control unit 202 compresses the formed bitmap image by the image compressing and decompressing unit 11 and temporarily holds into the job data managing unit 208. The display list after completion of the bitmap conversion is deleted from the job data managing unit 208 by the job control unit 202. Subsequently, in S1504, the job control unit 202 instructs the PDF forming unit 210 to convert the bitmap image into the PDF. The PDF forming unit 210 converts the bitmap image into Image XObject of the PDF and outputs.

The differences among the PDF of the PS command description replacement, the partially RIP-completed PDF, and the RIP-completed PDF will now be described by using FIG. 10. FIG. 10 is a diagram in which drawing formats of a text, graphics (line), graphics (painting), an image, and a clip are arranged with respect to each PDF. The PDF of the PS command description replacement and the partially RIP-completed PDF are drawn in Form XObject of the PDF by the drawing formats shown in FIG. 10 as mentioned above. Since each drawing format of the PDF of the PS command description replacement coincides with the data expressing format of the PS/PDF in FIG. 6, its detailed description is omitted. Since each drawing format of the partially RIP-completed PDF coincides with the data expressing format of the display list in FIG. 6, its detailed description is omitted. The RIP-completed PDF is a PDF in which a single raster image is formed by rendering the whole EPS file and the raster image is expressed by Image XObject of the PDF. Therefore, each drawing element of the text, graphics, and image is expressed as each pixel in the raster image which has been rendered at output resolution. Since the clip is information which is unnecessary after the rendering, it is not included in the RIP-completed PDF.

Figure 11:
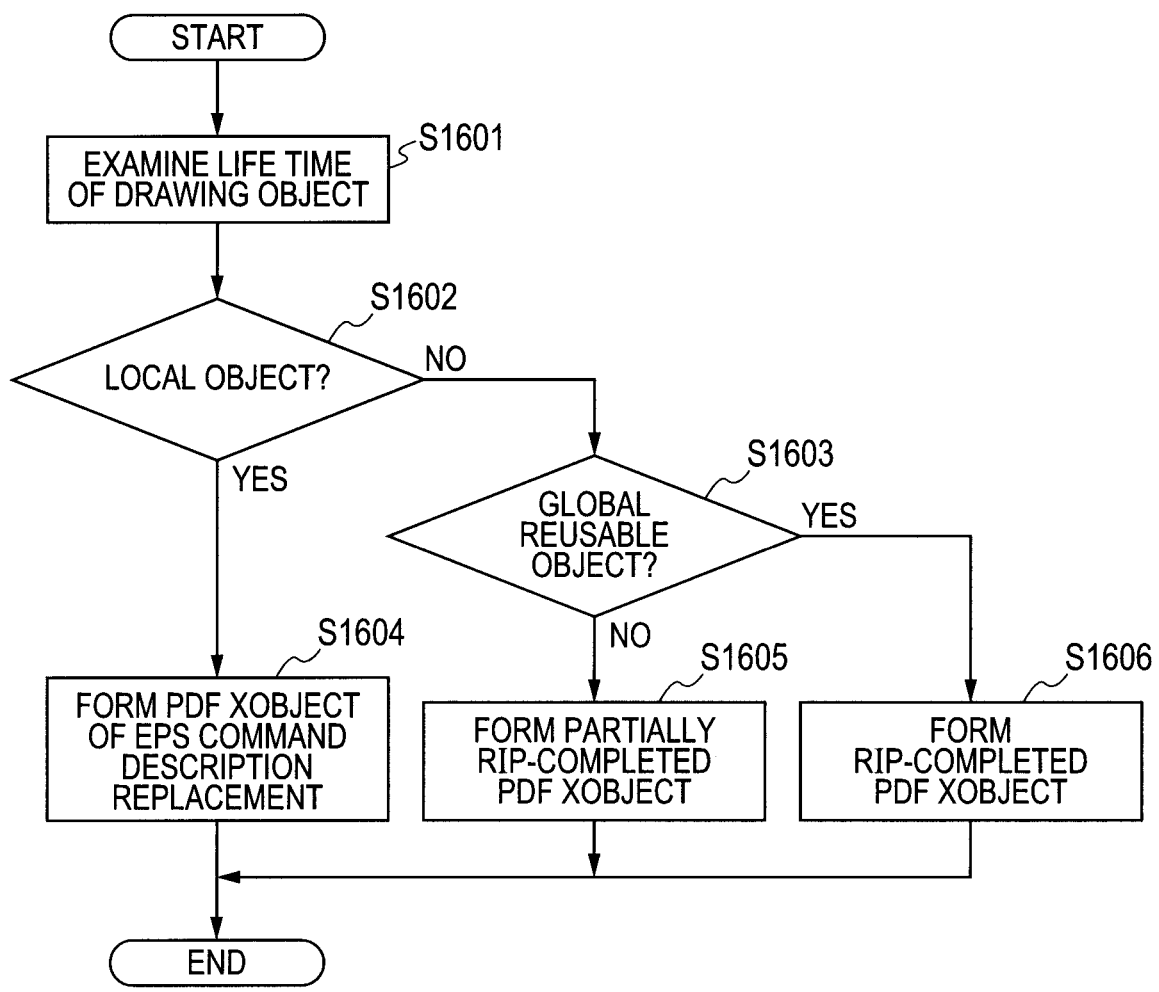
FIG. 11 is a flowchart illustrating an example of a process for selecting a converting method based on a life time of a drawing object.

The method of selectively using the foregoing three converting methods into PDF XObject will be described by using FIG. 11. A flowchart of FIG. 11 describes S1205 in FIG. 5 in more detail.

In S1601, the PPML interpreter 209 examines a life time as an example of attributes of the drawing object. As for the life time of the drawing object of the PPML, six kinds of elements of Local Object, Page, Document, DocSet, PPML, and Global exist in order from the short life time. Each of the five elements other than the local object indicates the life time of the reusable object. It is assumed that the life time has been set as an attribute in the drawing object. Subsequently, in S1602, the PPML interpreter 209 discriminates whether or not the life time of the drawing object is the local object as an example of a third threshold value. If YES (when the life time of the drawing object is equal to or shorter than the third threshold value), S1604 follows and the PS interpreter 213 forms PDF XObject of the EPS command description replacement. A flowchart of FIG. 7 corresponds to details of S1604.

If NO in S1602, S1603 follows and the PPML interpreter 209 discriminates whether or not the drawing object is a global reusable object. The global reusable object is an object which can be reused over a plurality of jobs. Global as an example of a first threshold value among the elements of the kinds of the life time in the foregoing PPML drawing object corresponds to such an object. If the drawing object is not the global reusable object, it is a normal reusable object. The normal reusable object is an object which can be reused in the job or section. If NO, S1605 follows and the PS interpreter 213 forms partially RIP-completed PDF XObject. A flowchart of FIG. 8 corresponds to details of S1605.

If YES in S1603 (when the life time of the drawing object is equal to or longer than the first threshold value), S1606 follows and the PS interpreter 213 or the like forms RIP-completed PDF XObject. A flowchart of FIG. 9 corresponds to details of S1606. According to the selective using method in the embodiment, the longer the life time of the drawing object is, the more the data is converted into a form which is close to the raster image. This is because the longer the life time is, the higher a probability that the drawing object is reused is. The more the data is close to the raster image, the subsequent process can be executed at a high speed. However, there is such a problem that if all of the data is converted into raster images, a data capacity becomes too large. In the embodiment, therefore, the data whose appearance frequency is high is converted into a form near the raster image, thereby keeping a good balance between the data capacity and the processing speed.

In the embodiment, the selective use of the three kinds of converting methods into PDF XObject such as PDF XObject of the PS command description replacement, partially RIP-completed PDF XObject, and RIP-completed PDF XObject has been described as an example. However, two kinds of converting methods into PDF XObject may be selectively used.

That is, the image processing apparatus may selectively use PDF XObject of the PS command description replacement and partially RIP-completed PDF XObject according to the life time of the EPS. For example, the image processing apparatus may advance to S1604 if YES in the discrimination of S1602 in FIG. 11 and advance to S1605 if NO.

The image processing apparatus may selectively use PDF XObject of the PS command description replacement and RIP-completed PDF XObject according to the life time of the EPS. For example, the image processing apparatus may advance to S1604 if YES in the discrimination of S1602 and advance to S1606 if NO.

The image processing apparatus may selectively use partially RIP-completed PDF XObject and RIP-completed PDF XObject according to the life time of the EPS. For example, the image processing apparatus does not make the discrimination of S1602 in FIG. 11 but may advance to S1606 if YES in the discrimination of S1603 and advance to S1605 if NO.

Also in the cases of those constructions, the data of the PS format included in the variable print data can be efficiently converted into the data of the PDF format with respect to the data size and the processing time.

Embodiment 2

In the embodiment 1, the selective use of the three kinds of converting methods from the EPS into PDF XObject has been performed mainly based on the life time as an example of the attributes of the drawing object as a reference. As another method, a system of selectively using the three kinds of converting methods according to an area of the drawing area of the drawing object will now be described by using FIG. 12.

Figure 12:
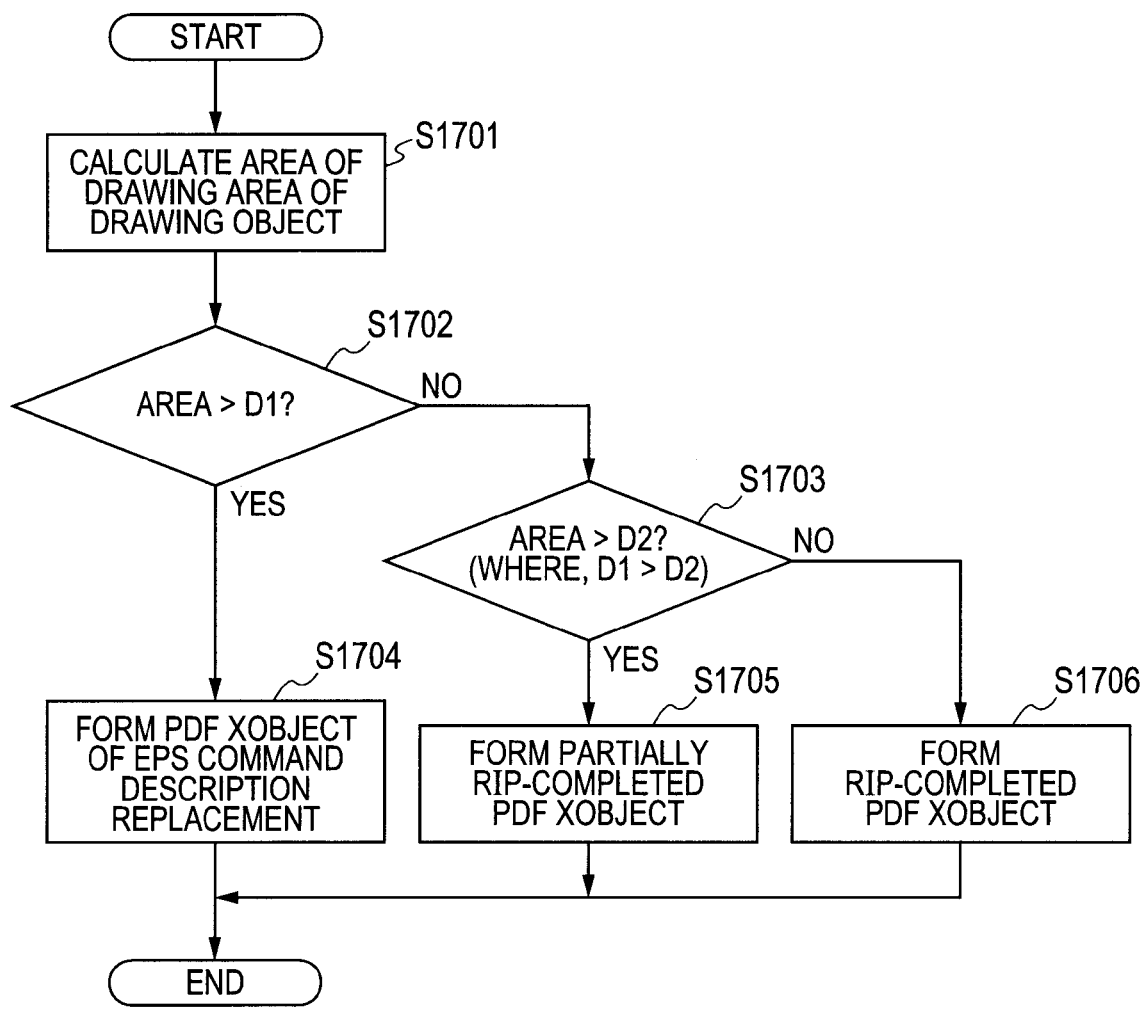
FIG. 12 is a flowchart illustrating an example of a process for selecting the converting method based on an area of a drawing area of the drawing object.

A flowchart of FIG. 12 describes S1205 in FIG. 5 in more detail. In S1701, the PPML interpreter 209 calculates the area of the drawing area of the drawing object. Although the area of the drawing area is calculated here, in the case where the area of the drawing area has been set as an attribute of the drawing object, it is sufficient that the PPML interpreter 209 obtains the foregoing area. In the case where a width, a height, and the like of the drawing area have been set as attributes of the drawing object, the PPML interpreter 209 calculates the area of the drawing area from the width, height, and the like of the drawing area.

Subsequently, in S1702, the PPML interpreter 209 discriminates whether or not the calculated area is larger than D1 as an example of a fourth threshold value. If YES, S1702 follows and the PS interpreter 213 forms PDF XObject of the EPS command description replacement. The flowchart of FIG. 7 corresponds to details of S1704. If NO in S1702 (when the area of the drawing area of the drawing object is equal to or less than the fourth threshold value), S1703 follows and whether the calculated area is larger than D2 as an example of a second threshold value is discriminated. A value smaller than the fourth threshold value D1 is selected as a second threshold value D2. If YES, S1705 follows and the PS interpreter 213 forms partially RIP-completed PDF XObject. The flowchart of FIG. 8 corresponds to details of S1705. If NO in S1703 (when the area of the drawing area of the drawing object is equal to or less than the second threshold value), S1706 follows and the PS interpreter 213 or the like forms PDF XObject of the RIP-completed image. The flowchart of FIG. 9 corresponds to details of S1706.

According to the present selective using method, the smaller the area of the drawing object is, the more the data is converted into a form which is close to the raster image. Thus, an increase in data capacity after the conversion can be prevented.

In the embodiment, the selective use of the three kinds of converting methods into PDF XObject such as PDF XObject of the PS command description replacement, partially RIP-completed PDF XObject, and RIP-completed PDF XObject has been described as an example. However, two kinds of converting methods into PDF XObject may be selectively used.

That is, the image processing apparatus may selectively use PDF XObject of the PS command description replacement and partially RIP-completed PDF XObject according to the area of the drawing area of the EPS. For example, the image processing apparatus may advance to S1704 if YES in the discrimination of S1702 in FIG. 12 and advance to S1705 if NO.

The image processing apparatus may selectively use PDF XObject of the PS command description replacement and RIP-completed PDF XObject according to the area of the drawing area of the EPS. For example, the image processing apparatus may advance to S1704 if YES in the discrimination of S1702 in FIG. 12 and advance to S1706 if NO.

The image processing apparatus may selectively use partially RIP-completed PDF XObject and RIP-completed PDF XObject according to the area of the drawing area of the EPS. For example, the image processing apparatus does not perform the discrimination of S1702 in FIG. 12 but may advance to S1705 if YES in the discrimination of S1703 and advance to S1706 if NO. Also in the cases of those constructions, the data of the PS format included in the variable print data can be efficiently converted into the data of the PDF format with respect to the data size and the processing time.

Further, the above method can be also combined with the converting method in which the life time of the drawing object is used as a reference in the embodiment 1. For example, even when the life time of the drawing object is long, if the area of the drawing area is large, the image processing apparatus selects the system of forming PDF XObject of the EPS command description replacement. On the contrary, even when the life time of the drawing object is short, if the area of the drawing area is small, the image processing apparatus selects the system of forming PDF XObject of the RIP-completed image. Thus, the converting system in which the balance between the data capacity and the processing speed is further optimized can be realized.

OTHER EMBODIMENTS

The invention is also realized by executing the following processes. That is, software (program) for realizing the foregoing embodiments is supplied to a system or an apparatus through a network or various kinds of storing media and a computer (or a CPU, MPU, or the like) of the system or apparatus reads out the program and executes processes corresponding thereto.

As mentioned above, according to each of the foregoing embodiments, by converting the PS description into the partially RIP-completed format, the data can be made to properly approach the raster image without increasing the data size so much. Therefore, the time which is required for the RIP process of the data after the conversion is also shortened. Further, by converting the data whose life time as a drawing object is long into the raster image, a total converting efficiency can be further raised. A fact that the life time as a drawing object is long denotes that a possibility that the object is reused is high by an extent corresponding to such a long life time. In the variable data printer, by caching a result obtained by RIP-processing the drawing object which is reused, a high speed is realized. However, at a position where the drawing object appeared first, it is necessary to certain perform the RIP and there is a case where the RIP time of the corresponding page is not in time for the engine speed. However, in the method shown in the foregoing embodiment, such a drawback is also improved and a possibility that the printing after the conversion is in time for the engine speed rises. However, according to the method shown in the foregoing embodiment, since all of the drawing objects are not converted into images, the data size can be also suppressed. According to the method shown in the foregoing embodiment, it can be also considered that the RIP process is left within a range where the printing is in time for the engine speed. The total converting efficiency is very high.

Although the exemplary embodiments of the invention have been described above, the invention is not limited to the specific embodiments but various modifications and changes are possible within the purview of the spirit of the invention disclosed in claims.

Figure 8:
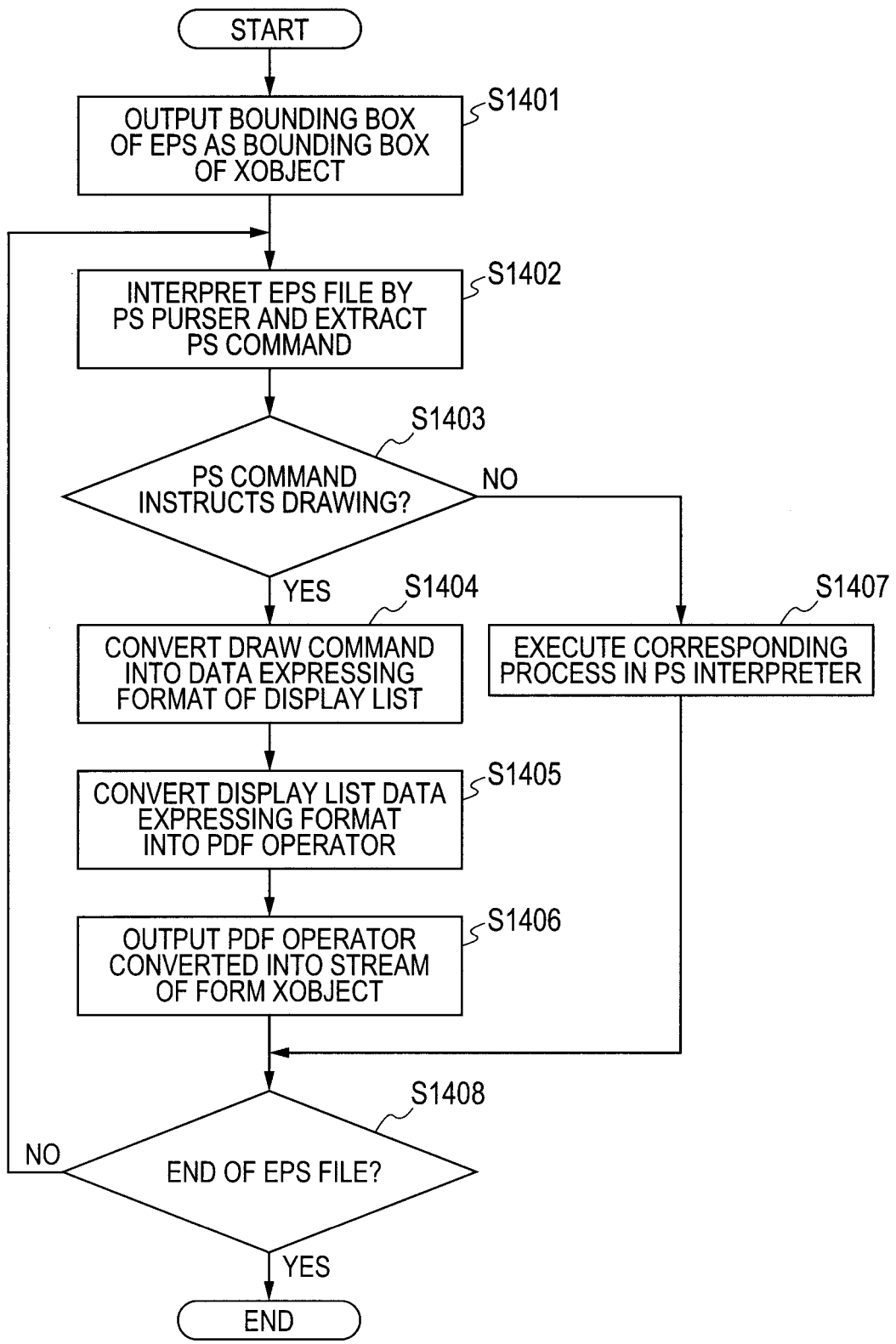
FIG. 8 is a flowchart illustrating an example of a process for interpreting the EPS and forming a partially RIP-completed PDF.

An example of the processes by "partially RIP-completed image data converting means" disclosed in claims corresponds to, for example, processes of S1605, S1705, and the flowchart of FIG. 8 and the like mentioned above. An example of the processes by "RIP-completed image data converting means" disclosed in claims corresponds to, for example, processes of S1606, S1706, and the flowchart of FIG. 9 and the like mentioned above. An example of the processes by "converting means" disclosed in claims corresponds to, for example, processes of S1604, S1704, and the flowchart of FIG. 7 and the like mentioned above. An example of the processes by "selecting means" disclosed in claims corresponds to, for example, processes of S1602, S1603, S1702, S1703, and the like mentioned above.

According to the embodiments of the invention, the data of the PS format included in the variable print data can be efficiently converted into the data of the PDF format with respect to the data size and the processing time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240740, filed Oct. 19, 2009, which is hereby incorporated by reference herein in its entirety.

The invention claimed is:

1. An image processing apparatus comprising:
a first converting unit configured to convert a drawing object of data of a PS format into partially RIP-completed image data of a PDF format;
a second converting unit configured to convert the drawing object of the data of the PS format into RIP-completed image data of the PDF format; and
a selecting unit configured to select, according to an attribute of each of a plurality of drawing objects of the data of the PS format included in variable print data, either a mode in which each of the drawing objects of the data of the PS format is converted into the data of the PDF format by the first converting unit or a mode in which each of the drawing objects of the data of the PS format is converted into the data of the PDF format by the second converting unit.

2. An image processing apparatus according to claim 1, wherein
the attribute of the drawing object is a lifetime of the drawing object, and
when the lifetime of the drawing object of the data of the PS format is shorter than a first threshold value, the selecting unit selects the mode in which the drawing object of the data of the PS format is converted into the data of the PDF format by the first converting unit, and when the lifetime of the drawing object of the data of the PS format is equal to or longer than the first threshold value, the selecting unit selects the mode in which the drawing object of the data of the PS format is converted into the data of the PDF format by the second converting unit.

3. An image processing apparatus according to claim 1, wherein
the attribute of the drawing object is the area of a drawing area of the drawing object, and
when the area of the drawing area of the drawing object of the data of the PS format is larger than a second threshold value, the selecting unit selects the mode in which the drawing object of the data of the PS format is converted into the data of the PDF format by the first converting unit, and when the area of the drawing area of the drawing object of the data of the PS format is equal to or smaller than the second threshold value, the selecting unit selects the mode in which the drawing object of the data of the PS format is converted into the data of the PDF format by the second converting unit.

4. An image processing apparatus according to claim 1, further comprising a third converting unit configured to convert the drawing object of the data of the PS format into the data of the PDF format by converting a command description of the data of the PS format into a command description of the data of the PDF format,
and wherein, according to the attribute of each of the plurality of drawing objects of the data of the PS format included in the variable print data, the selecting unit selects one of a mode in which each of the drawing objects of the data of the PS format is converted into the data of the PDF format by the third converting unit, the mode in which each of the drawing objects of the data of the PS format is converted into the data of the PDF format by the first converting unit, and the mode in which each of the drawing objects of the data of the PS format is converted into the data of the PDF format by the second converting unit.

5. An image processing apparatus according to claim 4, wherein the attribute of the drawing object is a lifetime of the drawing object, and
when the lifetime of the drawing object of the data of the PS format is equal to or shorter than a third threshold value, the selecting unit selects the mode in which the drawing object of the data of the PS format is converted into the data of the PDF format by the third converting unit, when the lifetime of the drawing object of the data of the PS format is longer than the third threshold value and is shorter than a first threshold value, the selecting unit selects the mode in which the drawing object of the data of the PS format is converted into the data of the PDF format by the first converting unit, and when the lifetime of the drawing object of the data of the PS format is longer than the third threshold value and is equal to or longer than the first threshold value, the selecting unit selects the mode in which the drawing object of the data of the PS format is converted into the data of the PDF format by the second converting unit.

6. An image processing apparatus according to claim 4, wherein the attribute of the drawing object is the area of a drawing area of the drawing object, and when the area of the drawing area of the drawing object of the data of the PS format is larger than a fourth threshold value, the selecting unit selects the mode in which the drawing object of the data of the PS format is converted into the data of the PDF format by the third converting unit, when the area of the drawing area of the drawing object of the data of the PS format is equal to or smaller than the fourth threshold value and is larger than a second threshold value, the selecting unit selects the mode in which the drawing object of the data of the PS format is converted into the data of the PDF format by the first converting unit, and when the area of the drawing area of the drawing object of the data of the PS format is equal to or smaller than the fourth threshold value and is equal to or smaller than the second threshold value, the selecting unit selects the mode in which the drawing object of the data of the PS format is converted into the data of the PDF format by the second converting unit.

7. An image processing apparatus comprising:
a first converting unit configured to convert a drawing object of data of a PS format into data of a PDF format by converting a command description of the data of the PS format into a command description of the data of the PDF format;
a second converting unit configured to convert the drawing object of the data of the PS format into partially RIP-completed image data of the PDF format; and
a selecting unit configured to select, according to an attribute of each of a plurality of drawing objects of the data of the PS format included in variable print data, either a mode in which each of the drawing objects of the data of the PS format is converted into the data of the PDF format by the first converting unit or a mode in which each of the drawing objects of the data of the PS format is converted into the data of the PDF format by the second converting unit.

8. An image processing apparatus comprising:
a first converting unit configured to convert a drawing object of data of a PS format into data of a PDF format by converting a command description of the data of the PS format into a command description of the data of the PDF format;
a second converting unit configured to convert the drawing object of the data of the PS format into RIP-completed image data of the PDF format; and
a selecting unit configured to select, according to an attribute of each of a plurality of drawing objects of the data of the PS format included in variable print data, either a mode in which each of the drawing objects of the data of the PS format is converted into the data of the PDF format by the first converting unit or a mode in which each of the drawing objects of the data of the PS format is converted into the data of the PDF format by the second converting unit.

9. An image processing method carried out in an image processing apparatus, comprising:
a first step of converting a drawing object of data of a PS format into partially RIP-completed image data of a PDF format;
a second step of converting the drawing object of the data of the PS format into RIP-completed image data of the PDF format; and
selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format is converted into the data of the PDF format in the second step.

10. An image processing method which is executed by an image processing apparatus, comprising:
a first step of converting a drawing object of data of a PS format into data of a PDF format by converting a command description of the data of the PS format into a command description of the data of the PDF format;
a second step of converting the drawing object of the data of the PS format into partially RIP-completed image data of the PDF format; and
selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format is converted into the data of the PDF format in the second step.

11. An image processing method which is executed by an image processing apparatus, comprising:
a first step of converting a drawing object of data of a PS format into data of a PDF format by converting a command description of the data of the PS format into a command description of the data of the PDF format;
a second step of converting the drawing object of the data of the PS format into RIP-completed image data of the PDF format; and
selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format is converted into the data of the PDF format in the second step.

12. A non-transitory computer-readable storage medium that stores a computer program for allowing a computer to execute an image processing method, the method comprising:
a first step of converting a drawing object of data of a PS format into partially RIP-completed image data of a PDF format;
a second step of converting the drawing object of the data of the PS format into RIP-completed image data of the PDF format; and
selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format is converted into the data of the PDF format in the second step.

13. A non-transitory computer-readable storage medium that stores a computer program for allowing a computer to execute an image processing method, the method comprising:
a first step of converting a drawing object of data of a PS format into data of a PDF format by converting a command description of the data of the PS format into a command description of the data of the PDF format;
a second step of converting the drawing object of the data of the PS format into partially RIP-completed image data of the PDF format; and selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format it is converted into the data of the PDF format in the second step.

14. A non-transitory computer-readable storage medium that stores a computer program for allowing a computer to execute an image processing method, the method comprising:
 a first step of converting a drawing object of data of a PS format into data of a PDF format by converting a command description of the data of the PS format into a command description of the data of the PDF format;
 a second step of converting the drawing object of the data of the PS format into RIP-completed image data of the PDF format; and
 selecting, according to an attribute of each of a plurality of drawing objects of the data of the PS format included in variable print data, either a mode in which each of the drawing objects of the data of the PS format is converted into the data of the PDF format in the first step or a mode in which each of the drawing objects of the data of the PS format it is converted into the data of the PDF format in the second step.

* * * * *